United States Patent
Ahonen

(10) Patent No.: US 7,260,618 B2
(45) Date of Patent: Aug. 21, 2007

(54) METHOD IN AN EMBEDDED ENVIRONMENT FOR ARRANGING FUNCTIONALITY OF A REMOTE DEVICE

(75) Inventor: Petri Ahonen, Jyväskylä (FI)

(73) Assignee: Nokia Corporation, Espoo (FI)

( * ) Notice: Subject to any disclaimer, the term of this patent is extended or adjusted under 35 U.S.C. 154(b) by 627 days.

(21) Appl. No.: 10/303,339

(22) Filed: Nov. 25, 2002

(65) Prior Publication Data

US 2003/0110238 A1    Jun. 12, 2003

(30) Foreign Application Priority Data

Dec. 10, 2001  (FI)  ................................. 20015047

(51) Int. Cl.
*G06F 15/16*  (2006.01)
(52) U.S. Cl. ............... 709/219; 709/203; 709/221; 709/222; 717/120; 717/168; 717/170; 717/171; 717/172; 717/173; 707/203
(58) Field of Classification Search ............... 709/203, 709/217, 220, 223, 219, 228, 221, 222; 719/315; 717/174, 168, 170, 171, 172, 173; 707/203, 707/120, 168–176
See application file for complete search history.

(56) References Cited

U.S. PATENT DOCUMENTS

| | | | | |
|---|---|---|---|---|
| 5,991,795 | A * | 11/1999 | Howard et al. | 709/201 |
| 6,098,108 | A * | 8/2000 | Sridhar et al. | 709/239 |
| 6,125,383 | A * | 9/2000 | Glynias et al. | 709/202 |
| 6,134,600 | A * | 10/2000 | Liu | 705/36 R |
| 6,202,207 | B1 * | 3/2001 | Donohue | 717/173 |
| 6,219,677 | B1 | 4/2001 | Howard | |
| 6,279,030 | B1 * | 8/2001 | Britton et al. | 709/203 |
| 6,301,601 | B1 * | 10/2001 | Helland et al. | 718/101 |
| 6,591,272 | B1 * | 7/2003 | Williams | 707/102 |
| 6,836,765 | B1 * | 12/2004 | Sussman | 705/75 |
| 6,868,454 | B1 * | 3/2005 | Kubota et al. | 709/237 |
| 6,898,618 | B1 * | 5/2005 | Slaughter et al. | 709/203 |
| 6,901,429 | B2 * | 5/2005 | Dowling | 709/203 |
| 6,910,067 | B1 * | 6/2005 | Sitaraman et al. | 709/203 |
| 6,954,754 | B2 * | 10/2005 | Peng | 707/10 |
| 7,003,777 | B2 * | 2/2006 | Hines | 719/316 |
| 2002/0124113 | A1 * | 9/2002 | Gargya et al. | 709/246 |
| 2002/0138727 | A1 * | 9/2002 | Dutta et al. | 713/167 |
| 2002/0188941 | A1 * | 12/2002 | Cicciarelli et al. | 717/175 |
| 2003/0018964 | A1 * | 1/2003 | Fox et al. | 717/177 |
| 2003/0110238 | A1 * | 6/2003 | Ahonen | 709/219 |
| 2003/0208641 | A1 * | 11/2003 | Wesemann | 709/332 |

FOREIGN PATENT DOCUMENTS

| | | |
|---|---|---|
| WO | WO 00/58912 | 10/2000 |
| WO | WO 01/16700 A2 | 3/2001 |

* cited by examiner

*Primary Examiner*—Michael Y. Won
(74) *Attorney, Agent, or Firm*—Alston & Bird LLP

(57) ABSTRACT

A method in an embedded environment for arranging functionality of a remote device, wherein a connection with a data network is arranged for at least one remote device and at least one server machine. A gateway can be connected to data network, and can be arranged between the at least one server machine and the data network, wherein the at least one remote device and at least one server machine and the gateway operate in an environment based on an ORB (Object Request Broker) core.

13 Claims, 4 Drawing Sheets

METHOD IN AN EMBEDDED ENVIRONMENT FOR ARRANGING FUNCTIONALITY OF A REMOTE DEVICE

FIELD OF THE INVENTION

The invention concerns a method in an embedded environment for arranging functionality of a remote device, wherein parties are
- at least one remote device and at least one server machine, in connection with which at least a processor, storage media and terminal equipment are arranged for communication in a data network, and wherein a connection is arranged for both parties with a data network, in connection with which a possible gateway between the server machine and the data network is arranged and wherein the parties and the possible gateway operate in an environment based on an ORB (Object Request Broker) core and wherein for arranging functionality of the remote device in steps
- one of the said parties takes the measures required to form a functionality request,
- the functionality request is supplied to the server machine,
- the functionality request is interpreted by the server machine,
- the server machine takes the measures required to bring about functionality, and
- the server machine processes the result from the measures in accordance with an established criterion.

BACKGROUND OF THE INVENTION

The "embedded environment" concept usually means a combination formed by processor-based equipment and software, which is arranged to function as a part of some larger system configuration. Usually they are designed to be as simple as possible and they do not often include e.g. any mass storage components or peripheral devices in general. Many embedded systems are fitted e.g. into automatic vending machines of different kinds, of which beverage vending machines are mentioned as an example.

Connecting devices based on embedded systems to the Internet and all networking of such devices in general offers many possibilities for increasing the intelligence of remote devices and a better ability to fulfil the requirements of their users and their administration.

Innumerable examples may be mentioned of application areas for such networked embedded systems, from the HPAC systems and simple energy consumption measurements of real estate to large equipment and alarm systems. For example, it is known from copying machines to utilise embedded systems to detect their operational state. Networking of embedded systems will hereby allow e.g. their remote control, remote analysing and remote management.

Known solutions for the outgoing and incoming data transfer of remote devices based on embedded systems are represented by utilisation of such simple data transfer interfaces taking place at hardware level, through which it is possible to report e.g. on the need for maintenance of the remote devices or on the need for supplementation of their sale products.

However, more complex administration applications represent a real challenge to embedded systems. Since embedded systems are often implemented as advantageously as possible, so that they lack e.g. data storage capacity on a large scale, such known data transfer methods are avoided, which are in general use in computer networks, and in their place much simpler protocols are in general use, which operate at hardware level.

The administration and status monitoring of an embedded remote device, such as e.g. a beverage vending machine, are presented as an example of such a simple mode of operation utilising data transfer protocol at hardware level.

According to the state of the art, the functionality of a beverage vending machine is often arranged in such a way that a processor unit is arranged for the remote device, which usually is a micro controller and storage media. In the storage media are stored i.a. the software required for the management, monitoring and operation of the beverage vending machine.

When information is desired e.g. about the beverage vending machine's degree of fullness, a monitoring call can be made to the beverage vending machine at the operator end of the monitoring system. In consequence of this a data transmission link is set up through the data network, such as e.g. a telephone network, to the server machine of the operator end. When the link has been successfully established between the parties, a data transmission procedure of several different steps follows, wherein data is transmitted from the remote device to the server machine and possibly back.

When data transmission takes place between the parties, e.g. in serial form, a serial link is first opened from the beverage vending machine and information on the successful establishment of the link is relayed to the server at the operator end. When the server has ascertained the bit string depicting the open state of the link, a transmission takes place through the data network from the beverage vending machine's memory registers of values necessary for finding out the current status of the beverage vending machine, based on which values the server machine will find out the answer to the matter of the request. During the time when the line is open much data transmission then follows in various steps between the remote device and the server machine inquiring about its status.

In the solution of the described kind the size of the transmitted data is not very big (a few tens—hundreds of bits), but the traffic back and forth will cause varying loading in the network and will bring about a certain uncertainty for the data transmission, because the data transmission takes place in individual pieces independently of each other. Furthermore, the described manner of data transmission may require, for example, a circuit-switched data transmission network (e.g. a line telephone connection), which is often very difficult to arrange for the remote device.

Furthermore, the ability to update the application programmes arranged for the remote devices will be very difficult, both technically and quantitatively. When need arises to update the programme of the remote device, each remote device must be visited for taking measures in order to update a new software version or even to install a new application module. In more advanced versions it may be possible by way of the data network to download such a special update packet separately for each remote device, which replaces the old software version. If there are numerous remote devices and different versions for these, updating of the software will become even more difficult.

The application development of remote devices is also difficult, since their application code is usually a micro controller-based native language. Hereby they are machine language, which the processor can interpret directly, such as an assembler, the editing and further developing of which is especially difficult and requires much studying of programming and e.g. knowledge of the fixed data transmission protocols used in each case.

What is characteristic in the solution of the described kind is that its functionality is arranged in a fixed manner at the remote device. If it is not especially critical in terms of time to bring about the functionality, then it can also be arranged at the server machine, but the data transmission will strongly take place in the described manner at hardware level.

In more advanced operational modes, downloading of remote functionality is done by using a native code at hardware level. However, without e.g. a complete remote file management system it is hereby difficult to achieve a seamlessly changing functionality during dynamics and processing. In addition, the references relating to data transmission are arranged to be fixed in the application code proper.

U.S. publications U.S. Pat. No. 6,134,600 (Liu), U.S. Pat. No. 5,991,795 (Howard et al.) and U.S. Pat. No. 6,219,677 (Howard) present more advanced methods for solving the situations described above.

U.S. publication 6,134,600 (Liu) describes a solution, wherein remote devices are offered application tools located at the server machine in a Common Object Request Broker Architecture, that is, in a CORBA customer-server architecture. The remote device is hereby allowed access to tools located at the server machine without revealing their relating functionality. At the server machine, where the system's functionality is essentially arranged, JAVA applets are maintained. The remote devices relay parameters required for the analysis to the server machine, wherein the JAVA applets will process the desired analysis. Then the answer is returned to the remote device. The described solution is WEB-based and it strongly bound to a data network according to the TCP/IP protocol.

U.S. publication 5,991,795 (Howard et al.) also presents a data transmission protocol and a method especially for exchanging information in embedded systems over a data network. This solution, too, is characterised by use of the HTTP protocol. Such methods based on presenting languages, such as e.g. JAVA applets according to HTML, are used in interaction situations aimed directly at the end user. JAVA applets cannot actually be linked up with a native application code and they are not either dynamic. Further, the locations of applets are always attached to a defined HTML page and their execution requires a relatively efficient processor and hardware, whose sizes are minimised as far as possible in the embedded environments.

It is known in JAVA profiles, such as J2ME (Java 2 Platform, Micro Edition) to define references for downloading of remote application. However, offering of these to remote devices and their chaining to one another is not defined. Functionality as the JAVA interface with a native code is standardised to be fixed in each profile, so under these circumstances it is not application-specific.

CORBA, which was already mentioned in the foregoing, is the core of the network operating system defined by the OMG organisation. It makes possible compatibility of data transmission between different hardware and operating system platforms and data networks from the smallest micro controllers to the most efficient micro processors. The ORB operating system core in accordance with the CORBA architecture carries out the format change required between different operation environments, whereby that part of the data is filtrated away at the same time, which is inessential to the environment used by the receiving party.

The ORB core based on CORBA seeks implementation of the service requested by the customer, converts and transfers the parameters relating to the service, activates implementation, if required, and transfers the control to the service object. After performance of the service, ORB will return any results there may be to the customer formatted according to his environment.

From JAVA an own ORB RMI (Remote Method Invocation) built into JAVA is also known, which corresponds with the ORB concept of CORBA. However, RMI is only an expansion of the language, so it will not function with objects made in other languages. JAVA will thus remove the borders between hardware environments, but it will bind to a certain programming language.

However, an attempt can be made to solve this limitation with JNI (JAVA Native Interface). JNI makes it possible to call also other components (for example, C, C++) made in other languages from JAVA and vice versa. However, JNI for its part binds the programme strongly to a certain hardware architecture.

SUMMARY OF THE INVENTION

The purpose of this invention is to bring about an essentially improved method for arranging functionality of a remote device in an embedded environment. Claim 1 presents the characteristic features of the method.

The method according to the invention is based on architectures of the network operating system core, for example, of the CORBA type, which in architectural terms are capable of defining a dynamic interface for arranging functionality. The method according to the invention allows execution of a method call, whereby the desired functionality will take place with the remote device, but its final results are seen locally. The method according to the invention makes possible e.g. characteristics provided by the CORBA architecture, wherein e.g. dynamic interfaces are defined for the system's functionality and extension of the locations of functions.

With the method according to the invention such advantages are achieved as an essentially reduced need for memory resource in the remote devices, because the functionality relating to these need not be stored in the remote device. The method further allows dynamic changing of the functionality relating to the remote device's method call and an essentially improved updating ability, because the code corresponding to all functionality is arranged in a centralised manner in the server machine. Processing of method calls is speeded up essentially compared with the state of the art, where the functionality relating to the method call is now carried out in a CORBA architecture in a central unit, whereby the functionality of the terminal device requires remote operation during the time when method calls are being processed.

The method according to the invention essentially improves the security and privacy of embedded systems, because the application data proper can be kept in the remote device in connection with the application and the remote methods fetched from the server machine can be run in a local environment, which is dynamic and which is removed after the processing. The other features characterising the method according to the invention, emerge from the appended claims.

BRIEF DESCRIPTION OF THE DRAWINGS

The method according to the invention, which is not limited to the embodiments presented in the following, is described in greater detail by referring to the appended figures, wherein.

DETAILED DESCRIPTION OF THE INVENTION

Figure 1:
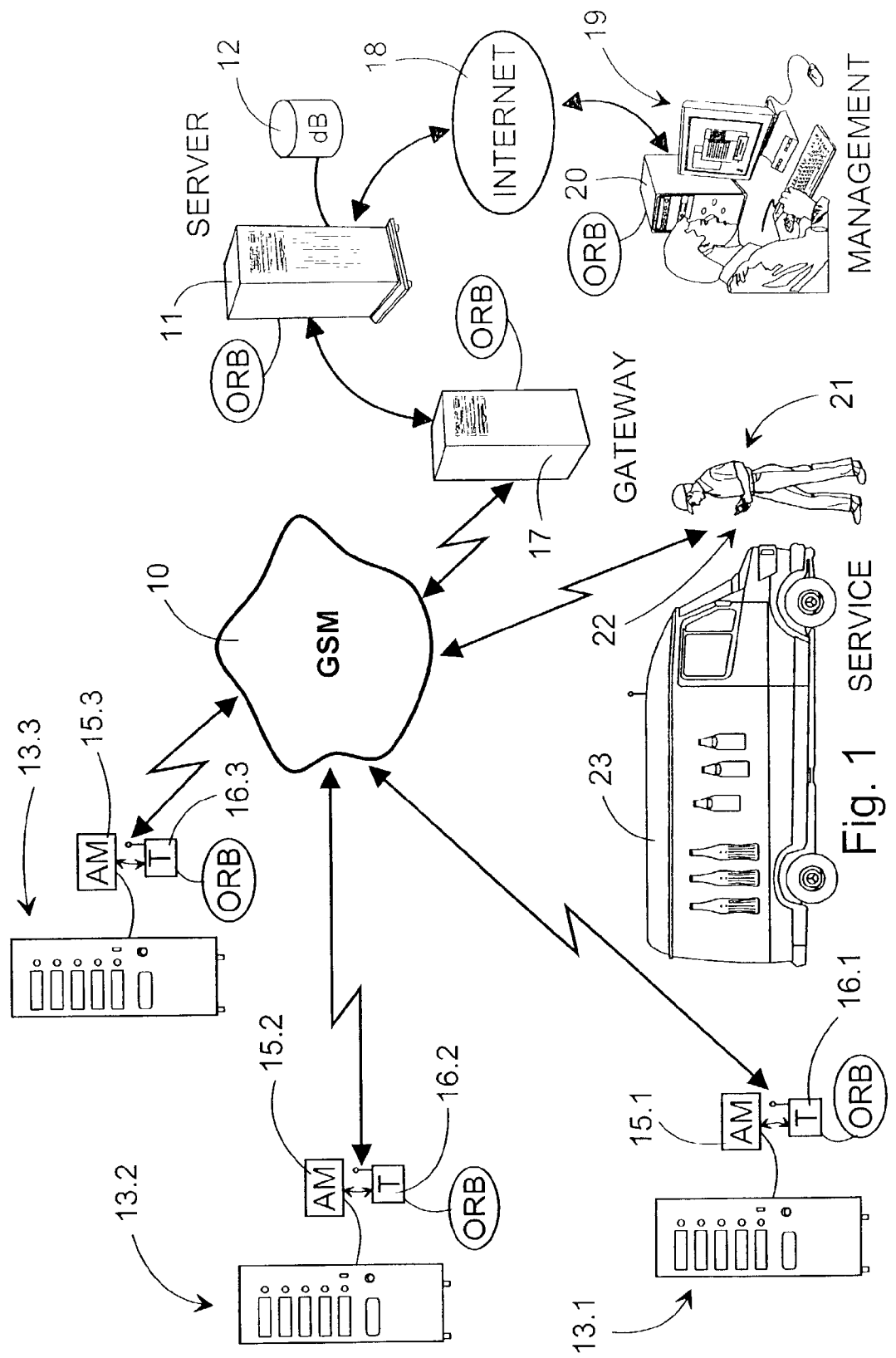
FIG. 1 is a schematic view of an application example using the method according to the invention.

FIG. 1 shows by way of example a diagram of the parties and components in an application example utilising the method according to the invention in an embedded environment. The remote devices in the example are beverage vending machines 13.1, 13.2, 13.3, which are geographically decentralised to beverage outlets. In connection with the beverage vending machines 13.1, 13.2, 13.3 terminal devices 16.1, 16.2, 16.3 are arranged, which connect them with a data network 10. For example, a caretaker (SERVICE) 21 moving in a car 23 attends to the maintenance and replenishment of the beverage vending machines 13.1, 13.2, 13.3, and the caretaker also has means 22 for communicating in the data network 10.

In the method according to the invention it is possible to utilise any wireless or wireline data transmission link. Such are, for example, wireless networks based on GSM (e.g. SMS, GPRS), UMTS and other 3G technologies (e.g. EDGE, TDMA). It is also possible to utilise the Internet by using various transmission protocols and to use LAN and WLAN networks.

In the application example a wireless GSM network 10 is used, wherein communication can take place e.g. with GPRS (Group Packet Radio Service) technology or through a PSTN (Public Switched Telephone Network) gateway. For these such means are arranged in connection with data network 10, which include at least switching centres 31, 32 (FIG. 2) to allow data transmission.

A server machine 11 based on the ORB (Object Request Broker) core of CORBA architecture, is connected to the data network 10 also through a gateway 17 based on the ORB core. One duty of the gateway 17 is to carry out a protocol conversion, which allows data transmission between terminal devices operating in various types of data networks. The gateway 17 is not a compulsory component in the method according to the invention, if the parties communicating with each other use the same data transmission protocol, such as e.g. TCP/IP in communication from terminal device 13.2 to the IP address of server machine 11.

A connection e.g. to a database 12 is arranged for the server machine 11. Management, monitoring and reporting of the beverage vending machine's network can be carried out e.g. with a terminal device 20 of the management 19, for which a connection is arranged e.g. through the Internet 18 with the server machine 11. The network 18 may also be e.g. a company's intranet. The operation of the service company's terminal device 20 is also based on the ORB core.

The parties communicating with one another through data network 10 in the method according to the invention and any operative components located between them are arranged essentially based on the ORB (Object Request Broker) core. The said ORB core is based on CORBA (Common Object Request Broker Architecture) customer-server architecture, which is understood as an industrial standard for joining together decentralised software.

CORBA defines e.g. the markup language of interfaces and the programming interface, with the aid of which customer-server programmes can transfer information between the CORBA implementation of different manufacturers. Programme components according to the CORBA standard can communicate with each other, although written in different programming languages or operating in different hardware and operating system architectures. CORBA provides services e.g. for processing components and it carries out data format conversion between different architectures. Object-oriented CORBA is not a programming method as such, but it functions in the manner of "glue" between components made in different programming languages and using different devices.

The CORBA-based ORB core provides customer components with a transparent method for calling services located elsewhere. ORB facilitates the programming of decentralised applications by hiding routine actions relating to the data communication in such a way that the service request appears to the customer as a function or method call.

ORB hides e.g. the location of the service object, whereby the customer need give to ORB only the name or characteristics of the service he desires. The status and implementation of the service object are also unknown to the customer, as is the method of communication required to attain it. The IDL (Interface Definition Language) of ORB is a function search interface definition producing the existing services, which does not contain any control structures but only a presentation of the functions and data types of the interface.

In the method according to the invention, remote device 13.1, 13.2, 13.3 is formed as an embedded system. Remote device 13.1, 13.2, 13.3 has an AM (Application Module) 15.1, 15.2, 15.3, wherein there are e.g. possible storage media and a possible processor unit, which is e.g. a micro controller or a micro processor (not shown). Further, the remote device 13.1, 13.2, 13.3 also has ORB core-based terminal equipment 16.1, 16.2, 16.3 connected to the application module 15.1, 15.2, 15.3, which terminal equipment will make possible a connection for the remote device 13.1, 13.2, 13.3 with, for example, a GSM network 10. Application module solutions are possible also without a real processor unit, virtual functionality included in the AM application module 15.1, 15.2, 15.3 and storage media, whereby the functionality of the remote device 13.1, 13.2, 13.3 is processed at a virtual processor 27, FIG. 2, of the terminal equipment 16.1, 16.2, 16.3. Hereby the application module AM 15.1, 15.2, 15.3 separately custom-made for each application can be arranged to be as simple as possible.

Figure 2:
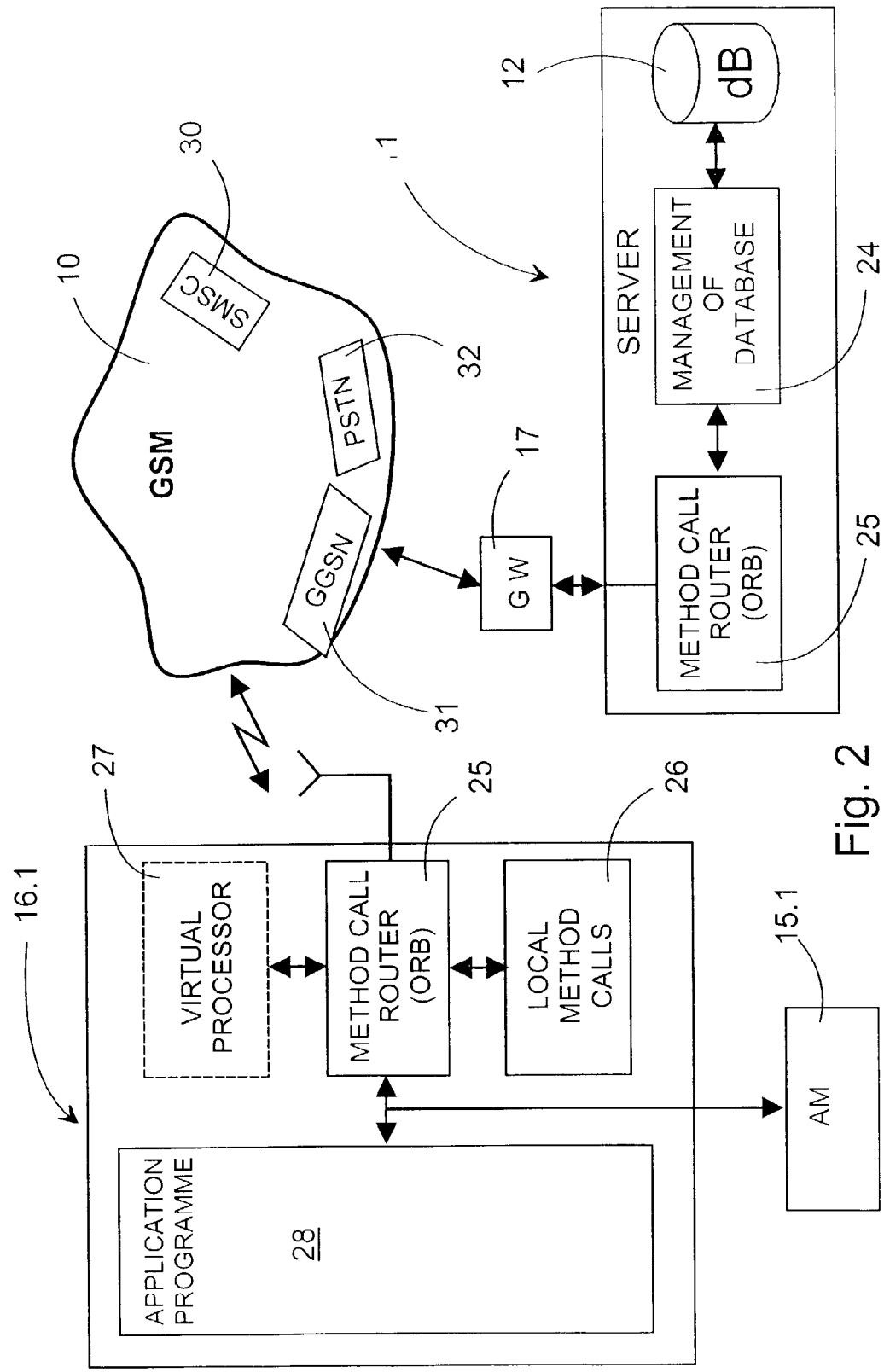
FIG. 2 is a rough schematic view of the logical parts of the parties.

FIG. 2 shows a rough schematic view of the logical components of terminal equipment 16.1 and arranged in connection with a remote device 13.1 and a server machine 11 used in the method according to the invention. Arranged at the terminal equipment 16.1 arranged in connection with remote device 13.1 are e.g. an application programme 28, an ORB core-based method call router 25 and local method calls 26, wherein the "fixed operation" of terminal equipment 16.1 is located. Virtual processor 27 is arranged e.g. in the storage media of terminal equipment 16.1 and it is activated when needed. Terminal equipment 16.1 is arranged in connection with the application module AM 15.1 of a beverage vending machine 13.1. In the method according to the invention no user connection at all need be arranged at the terminal equipment.

In the case shown in the example, data network 10 includes link components, such as e.g. a short message switching centre (SMSC) 30, GGSN 31 (GPRS Gateway Support Node) or a PSTN gateway 32 (for circuit-switched data) allowing outgoing and incoming communication in the network. The link components 30, 31, 32 communicate with the server machine 11 by way of a possible gateway 17, which is also based on the said ORB core. Besides carrying out protocol conversion, gateway 17 is intended to filter away all superfluous from the data transmitted between data networks using a different protocol, thus reducing unnecessary communication and reducing the load on the network 10.

The ORB core-based 25 server machine 11 is used for routing method calls in accordance with the method of the invention. A connection is arranged for server machine 11 with a database dB 12, which may be located in storage media arranged in connection with it or in a decentralised data network. Stored in the database dB 12 is a presentation of those downloadable remote method calls in high level language, which are controlled by database management partitions 24 of server machine 11.

Figure 3:
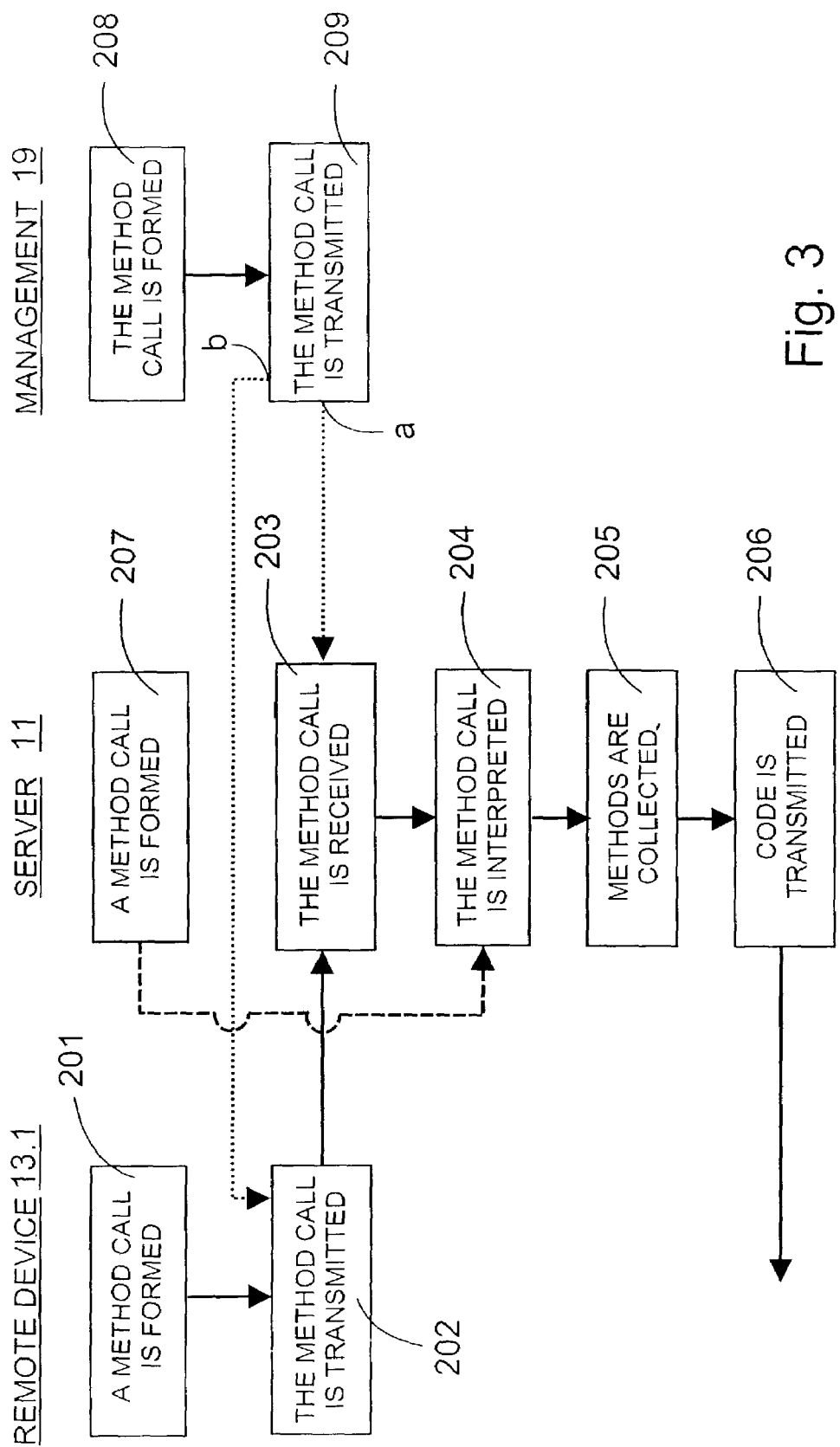
FIG. 3 is a flow chart showing the first half of the method according to the invention.
Figure 4:
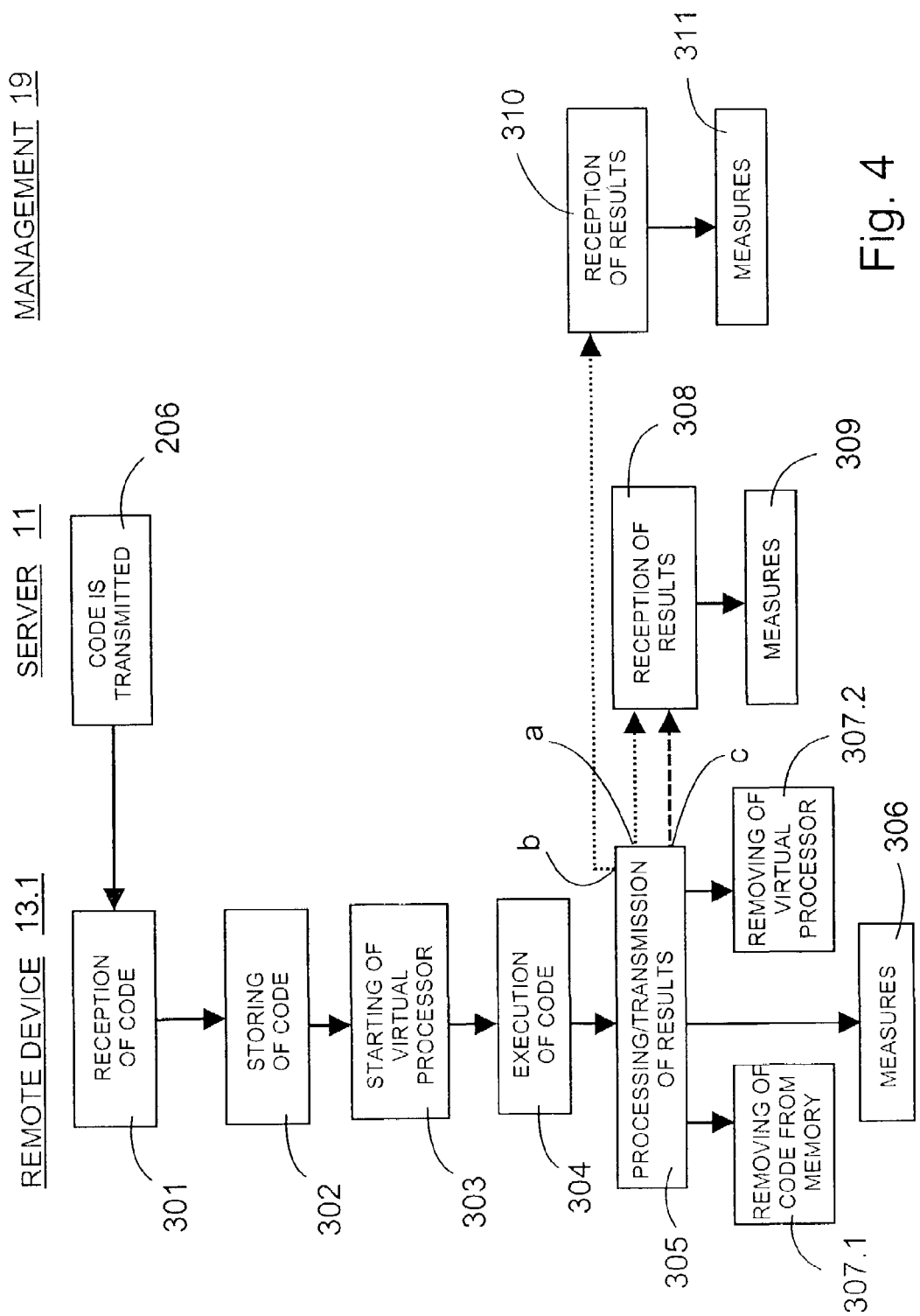
FIG. 4 is a flow chart showing the second part of the method according to the invention.

FIGS. 3 and 4 show some application examples of embodiments of the method of the invention for arranging functionality of remote devices 13.1, 13.2, 13.3. In a first embodiment of the method according to the invention, the method call router (ORB) 25 of the terminal equipment 16.1 of the remote device 13.1 searches for functionality in the local method call block 26 of terminal equipment 16.1. If the functionality requested by the application 28 is not found in terminal equipment 16.1, then in application 28 of the remote device 13.1 a service request is formed as a method call (201), which is transmitted (202) by terminal equipment 16.1 to network 10. The method call is relayed in some available data transmission manner (SMS, GPRS, etc.) to server machine 11.

The method call is routed in data network 10 to a possible gateway 17, which is located at the end of server machine 11, and the ORB core of which takes measures known as such to relay the call to the environment of server machine 11. Server machine 11 receives (203) and interprets the method call and the functionality (204) it contains, based on which the management partition 24 of the database will trawl database dB 12 and there collect a functionality (205) corresponding with the method call. Server machine 11 replies (206) with the programme code it has collected from its database dB 12 back to the remote device 13.1, which made the method call, by way of the ORB core 25 essentially through similar steps as in the relaying of the method call.

FIG. 4 shows the operational steps to be taken at remote device 13.1 after the programme code reply as well as the processing of results obtained in consequence of the execution of the code. Remote device 13.1 receives (301) the programme code sent by server machine 11 and edited by the ORB core at the various stages of the data network 10 to make it applicable in the operational environment of remote device 13.1, storing it in its storage media (302).

Then a virtual processor 27 (303) is activated at remote device 13.1, which is arranged in connection with the remote device and which is given as input for processing (304) the programme code stored in the memory and corresponding with the executed method call. In this embodiment, the results obtained from processing are given to the application programme 28 (305) of remote device 13.1, which programme will process the results in accordance with the set criterion and will take the corresponding steps (306). Then the programme code corresponding to the method call is removed from the memory (307.1) of the remote device 13.1 and the virtual processor 27 is also removed, which was used for processing the programme code (307.2).

FIGS. 3 and 4 also show another embodiment of the method according to the invention, which differs from the first embodiment as regards the steps wherein the method call is formed and the results are processed. The progress of the initial and final steps of the second embodiment is indicated by dashed arrow lines, otherwise by solid arrow lines. In this embodiment, the method call is formed in a management application (207) of beverage vending machines to be run in server machine 11. Server machine 11 interprets and searches its database dB 12 for the components needed for execution of the method call, of which it collects the functionality corresponding to the method call (204-205). Then server machine 11 transmits the programme code (206) it has collected to the concerned beverage vending machine 13.1. Steps (301-304) then follow, which were essentially described in the first embodiment.

When the virtual processor 27 to be run at the beverage vending machine 13.1 has processed the code (304), it sends (305c) the obtained results back to server machine 11. Server machine 11 receives the results (308) and takes the predetermined steps (309) in accordance with the result. The code is removed from the memory of beverage vending machine 13.1 and virtual processor 27 is destroyed as in the first embodiment (307.1, 307.2).

In a third embodiment of the invention, the method call is formed at a second remote device, such as a beverage vending machine 13.2 or, for example, at terminal equipment 20 of the operator 19 managing the system. This embodiment also differs from the said first embodiment as regards the initial and final steps of the method, and in FIGS. 3 and 4 reference is made to these different steps by dotted arrow lines, but otherwise a solid arrow line is used. The second remote device may e.g. be the said terminal equipment 20 of the operator 19 managing the system, which is used e.g. for managing server machine 11 with a WEB browser through the Internet 18. Operator 19 uses his WEB browser to define the method call (208) corresponding to the functionality he desires and transmits it through Internet 18 either to server machine 11 (209a) or possibly directly to the beverage vending machine 13.1 (209b), which the functionality concerns.

If the method call is transmitted directly to the beverage vending machine 13.1, which the functionality concerns, this receives the method call and transmits (202) it further to server machine 11. Server machine 11 receives the method call (203), whereupon server machine 11 and the beverage vending machine 13.1, which the method call concerns, will function essentially in accordance with steps (203-304), as was presented in the first embodiment.

The results obtained by the virtual processor 27 of the beverage vending machine 13.1 are transmitted to server machine 11 (305a) or/and to the managing 19 terminal equipment 20 (305b), which made the method call. These receive the results (308, 310) and take the steps required by the result in accordance with the established criterion (309, 311). The code to be executed and the virtual processor 27 are removed (307.1, 307.2) from the remote device 13.1.

The said second remote device may also be e.g. the caretaker's 21 mobile station terminal equipment 22, which is equipped e.g. with a WAP browser. The caretaker 21 is in connection through the WAP browser of his terminal equipment 22 with the server machine 11, which hereby functions as a WAP server. The caretaker 21 selects the functionality he desires from the WAP services maintained in server machine 11, and server machine 11 performs the steps required by that functionality. Then server machine 11 and the beverage vending machine 13.1, which the method call concerns, will function in accordance with steps (204-305), as was presented in the first embodiment. Transmission (305) of the results may take place through server machine 11 also to the caretaker's 21 mobile station terminal equipment 22, which receives them and takes the steps they require.

SMS messages of a given form may also be used for activation and aligning of the method call. However, terminal equipment 21 will then need e.g. ORB support and a user interface application functioning on it (not shown).

According to a fourth advantageous embodiment, the processed method call may also function as a monitoring function (not shown). Hereby a route map is fitted into the method call, according to which it orientates from one remote device 13.1, 13.2, 13.3 to another. In this embodiment some party makes a method call, whereby the code corresponding with its functionality will be directed from server machine 11 to the first remote device 13.3 at which the call is directed.

In the first remote device 13.3 that code corresponding to the call, which is delivered to it in the manner described above, is also processed in the manner described above. During processing a second method call is activated, which is addressed directly according to the route map to remote device 13.2. Along with the call a code and data relating to the functionality of the method call are also relayed to remote device 13.2, wherein an operation in a corresponding manner takes place. The overall result obtained in consequence of the processing of the method call at the end of the route map is addressed to the first caller, which may be e.g. the server machine 11 performing monitoring of the beverage vending machine.

In the method according to the invention, application programme 28 need not necessarily define the target device absolutely, to which the message travels (such as the target object is usually determined in CORBA), but this is also possible. Hereby the described method will function only when the target object is some terminal equipment. In order to clarify exceptional situations, such a message may be sent to the application programme at any stage of the method, by which the steps for achieving the desired functionality are interrupted. Then such steps are taken as the exceptional situation requires, possibly in a predetermined manner.

According to an advantageous embodiment of the invention, the method call is not removed from the memory of the remote device 13.1, 13.2, 13.3 after its processing. Hereby the method call is kept in the memory of the remote device 13.1, 13.2, 13.3 also after its processing and this recording can be advantageously used as the system's network cache memory. This is made possible by the dynamic addressing of methods, based on which their locations can be constantly found out by the parties, whereas the place of performance of methods is free as regards the server machine 11.

The method interface definition IDL ordinarily functions as a fixed definition, by which the server machine 11 and the application programme 28 command the operation of e.g. terminal equipment 16.1. If the method transmitted by server machine 11 to remote device 13.1 is preserved in the described manner in the memory of remote device 13.1, 13.2, 13.3 even after its processing, then the IDL (Interface Definition Language) of ORB of terminal equipment 16.1, that is, the method interface description, can be changed according to an advantageous embodiment. Terminal equipment 16.1 can hereby inform about the dynamic change of the IDL, which results from the availability of the additional interface. The party requesting functionality may also be the one to propose the function by giving information in his call about a permanent change of the method interface.

The method according to the invention can be implemented by using e.g. two processors, one of which is at the server machine 11 processing method calls made by the remote devices 13.1, 13.2, 13.3 while the other is at remote device 13.1, 13.2, 13.3 processing a code sent from server machine 11 and corresponding to the method call. An implementation with only one processor is also possible, if the processor arranged in connection with remote device 13.1, 13.2, 13.3 is implemented as a so-called Java virtual machine 27.

The stored code may be, for example, a native processor code (assembly) translated into computer language or alternatively some language at a higher level (e.g. Java), which is interpreted during the processing. Such a code is e.g. the so-called "limited Java", J2ME (Java 2, Micro Edition), which is intended especially for mobile applications.

The J2ME MIDP profile (Mobile Information Device Profile) operating on the Java virtual machine, which may be used in method calls implementing the method according to the invention, has specified methods for structuring a downloadable code, but not for management of downloadable routings, nor for operating conditions of downloading. The virtual processor 27 used at the remote device 13.1, 13.2, 13.3 may be e.g. in accordance with the J2ME specification or it may be based on a Java virtual machine KVM-java (K Virtual Machine) intended for limited environments.

The functionality request and its specified object are the minimum information needed by server machine 11 for implementing the functionality request.

It is to be understood that the foregoing description and the relating figures are intended only to illustrate the method according to the present invention. Thus, the invention is not limited only to the embodiments presented above or defined in the claims, but many such variations and modifications will be obvious to the professional in the art, which are possible within the scope of the inventive idea defined in the appended claims.

What is claimed is:

1. A method in an embedded environment for arranging functionality of a remote device, wherein at least one remote device, at least one server machine, at least a processor, storage media and terminal equipment communicate in a data network, wherein a connection is arranged for the at least one remote device and the at least one server machine between the data network, and wherein the at least one remote device and the at least one server machine function in an environment based on an ORB (Object Request Broker) core, the method for arranging functionality of the at least one remote device comprising:

implementing measures required to form a functionality request using at least one of the at least one remote device and the at least one server machine;

supplying the functionality request to the server machine;

interpreting the functionality request at the server machine;

implementing measures at the server machine which are required for bringing about the requested functionality, said server machine processing a result obtained as a consequence of the implemented measures in accordance with an established criterion;

wherein the functionality request comprises a method call to order the requested functionality from the server machine, the server machine collects from the storage media program code of a software component comprising the result which is defined in the method call and which implements the requested functionality, said program code of the software component being transmitted, relayed via a gateway arranged in connection with the data network and received during each step processed by the ORB core at the terminal equipment of the remote device, and in which the gateway is arranged to implement measures in order to minimize an amount of communication, and the program code of the software component received by the remote device is stored in its storage media, a virtual processor is activated at the remote device for which the program code of the software component is intended to arrange the functionality thereof, the program code of the software component is executed at the virtual processor, wherein the program code of the software component containing the functionality is removed from the storage media of the remote device after execution of the program code of the software component, the result obtained from the execution is processed in accordance with the established criterion, and the virtual processor is rendered passive at the storage media of the remote device.

2. The method of claim 1, wherein the data network comprises a wireless mobile station network.

3. Method according to claim 1, characterised in that the code containing the functionality is preserved at the remote device (13.1) as a network cache memory.

4. Method according to claim 1, characterised in that the code is a native processor code, which is in a form that can be directly interpreted by the virtual processor (27).

5. Method according to claim 1, characterised in that the code is in some high level language, such as e.g. Java, which is interpreted during the processing.

6. The method of claim 5, wherein the program code of the software component is arranged in a Java 2, Micro Edition (J2ME) format.

7. Method according to claim 5, characterised in that the virtual processor (27) is in accordance with the J2ME specification.

8. The method of claim 7, wherein the virtual processor is a Java virtual processor for use in limited environments.

9. Method according to claim 1, characterised in that in connection with the method call a routing map is arranged, in accordance with which the method call is processed in at least two remote devices (13.1, 13.2) and wherein finally the result obtained in consequence of routing is relayed to the party who initiated the method call.

10. The method according to claim 1, wherein the gateway functions in an environment based on the ORB core.

11. The method of claim 2, wherein the wireless mobile station network comprises a GSM network or a network based on 3G technology.

12. The method of claim 5, wherein the high level language comprises Java.

13. The method of claim 8, wherein the limited environments comprise a K Virtual Machine (KVM).

* * * * *

UNITED STATES PATENT AND TRADEMARK OFFICE
CERTIFICATE OF CORRECTION

| | |
|---|---|
| PATENT NO. | : 7,260,618 B2 |
| APPLICATION NO. | : 10/303339 |
| DATED | : August 21, 2007 |
| INVENTOR(S) | : Petri Ahonen |

It is certified that error appears in the above-identified patent and that said Letters Patent is hereby corrected as shown below:

Column 11, lines 31-33 Claim 3 should read:

3. The method of claim 1, wherein the program code of the software component containing the functionality is preserved at the remote device as a network cache memory.

Column 12, lines 1-3 Claim 4 should read:

4. The method of claim 1, wherein the code comprises a native processor program code of the software component, which is in a form that can be directly interpreted by the virtual processor.

Column 12, lines 4-6 Claim 5 should read:

5. The method of claim 1, wherein the program code of the software component comprises a high level language which is interpreted during the processing.

Signed and Sealed this

Twenty-ninth Day of January, 2008

JON W. DUDAS
*Director of the United States Patent and Trademark Office*